United States Patent [19]

Fujinaka et al.

[11] Patent Number: 5,102,164

[45] Date of Patent: Apr. 7, 1992

[54] VEHICLE SUSPENSION MOUNTING STRUCTURE

[75] Inventors: Mitsuru Fujinaka, Higashihiroshima; Nobuhiro Komatsu, Yokohama; Masayoshi Sannomiya, Hiroshima; Toshiro Kondo, Hatsukaichi, all of Japan

[73] Assignee: Mazda Motor Corporation, Hiroshima, Japan

[21] Appl. No.: 553,388

[22] Filed: Jul. 17, 1990

[30] Foreign Application Priority Data

Jul. 20, 1989 [JP] Japan ............................ 1-84493[U]
Jul. 20, 1989 [JP] Japan ............................ 1-84496[U]
Jul. 20, 1989 [JP] Japan ............................ 1-186146

[51] Int. Cl.⁵ .................................... B62D 21/00
[52] U.S. Cl. ......................... 280/788; 180/891; 296/188; 296/194
[58] Field of Search ............. 180/89.1; 280/781, 785, 280/788, 673, 675, 701; 296/188, 194

[56] References Cited

U.S. PATENT DOCUMENTS 4,671,531  6/1987  Sautter et al. .................. 280/701
4,919,474  4/1990  Adachi et al. .................. 296/194

FOREIGN PATENT DOCUMENTS

62-1762    1/1987  Japan .
62-187904 11/1987  Japan .

Primary Examiner—Kenneth R. Rice

[57] ABSTRACT

A vehicle suspension mounting structure for mounting a suspension device to a vehicle body. At least the upper arm of the suspension device is constituted by two link members disposed to be spaced apart by a predetermined distance in the vertical direction of the body with respect to a vehicle wheel support member. The suspension mounting structure includes a mounting member for mounting the rear end of the upper link member to an upper frame extending along the back-and-forth direction of the vehicle body.

8 Claims, 12 Drawing Sheets

VEHICLE SUSPENSION MOUNTING STRUCTURE

BACKGROUND OF THE INVENTION

The present invention relates to a vehicle suspension mounting structure arranged in a portion where a suspension device for suspending a vehicle body is mounted.

As a suspension device for a vehicle, for example, a so-called double-wishbone suspension device for supporting a vehicle wheel by A-shaped upper and lower arms is known, as disclosed in Japanese Utility Model Laid-Open No. 62-187904. In the double-wishbone suspension device, the position of a vehicle wheel is basically regulated by the upper and lower arms. For this reason, the relationships among the positions, arrangements, and lengths of these arms are selected to minimize squat upon starting of a vehicle or a change in camber angle or scuff when a vehicle wheel is moved in the vertical direction with respect to a vehicle body.

During travel of a vehicle, a shock load in the back-and-forth direction is input to a vehicle wheel due to a rough road surface. In the double-wishbone suspension device, since the upper arm (also the lower arm) is pivotally supported at two points, i.e., front and rear points, a rigidity in the direction of the shock load is increased. As a result, the shock is transmitted to the vehicle body, thus impairing riding comfort.

In order to eliminate the drawback of the riding comfort of the double-wishbone suspension device, elastic bushings in the two supporting portions of each arm are softened to decrease a support rigidity of a vehicle wheel in the back-and-forth direction. When the support rigidity is decreased, however, a support rigidity about a rotating shaft of a vehicle wheel is also decreased. As a result, the natural frequency of the support mechanism is decreased, and this causes resonation with a vibration of, e.g., a disk in a brake device provided to the vehicle wheel. In this manner, a so-called "brake jadder" undesirably occurs.

More specifically, in the double-wishbone suspension device having a normal structure, as disclosed in Japanese Utility Model Laid-Open No. 62-187904, riding comfort or brake jadder must be sacrificed, or both must be sacrificed to some extent.

To solve this problem, another structure is proposed. For example, as disclosed in Japanese Utility Model Publication No. 62-1762, a vehicle wheel support member is extended upward from a rim of a vehicle wheel, and an upper arm is mounted on the extended portion, so that a distance between the mounting point and the rotating shaft of the vehicle wheel is increased (a so-called high-mount double-wishbone suspension device). With this structure, the brake jadder can be prevented by a small force, and softer elastic bushings provided at two support points of the upper arm to the vehicle body can be used, thereby achieving both an improvement in riding comfort and prevention of brake jadder.

As described above, the so-called high-mount double-wishbone suspension device can achieve both improvement in riding comfort and prevention of brake jadder. However, another problem is posed.

More specifically, the upper arm of the double-wishbone suspension device comprises an A-shaped arm whose support points to a vehicle body are two points separated in the back-and-forth direction. In this manner, in order to allow the upper arm to swing in correspondence with vertical movement of a vehicle wheel, a wide space is required. However, it is difficult to assure a sufficient space since various parts must be arranged above the rim inside the vehicle wheel. For this reason, as shown in the drawing of the Japanese Utility Model Publication No. 62-1762, the length of the upper arm is decreased, and the upper arm must be obliquely arranged. When the length of the upper arm is decreased, a change in camber angle becomes too large upon vertical stroke of the vehicle wheel.

In order to eliminate the above drawbacks, the present applicant filed "Vehicle Suspension Device" as Japanese Patent Application No. 1-4873 on Jan. 13, 1990. According to this prior art, in a vehicle suspension device which swingably supports, via upper and lower arms, a vehicle wheel support member for rotatably supporting a vehicle wheel with respect to a vehicle body, at least the upper arm is constituted by two link members disposed to be spaced apart by a predetermined distance in the vertical direction of the vehicle body with respect to the vehicle wheel support member, so that a displacement of the vehicle wheel support member in the back-and-forth direction of the vehicle body is mainly regulated by the upper link member, and a displacement of the vehicle wheel support member in the widthwise direction of the vehicle body is mainly regulated by the lower link member.

According to the vehicle suspension device disclosed in this prior art, both improvement in riding comfort and prevention of brake jadder can be achieved, and the change in camber angle can have a desired tendency.

However, in this suspension device, since a very large load acts on a mounting portion of the upper one of the two link members constituting the upper arm, if a mounting rigidity of this portion is low, a vibration at the mounting portion which makes a driver and passengers uncomfortable is generated.

SUMMARY OF THE INVENTION

The present invention has been made in consideration of the above situation and has as its object to provide a vehicle suspension mounting structure which can attain a sufficient mounting rigidity at a mounting portion of the above-mentioned vehicle suspension device, in which at least the upper arm is constituted by two link members disposed to be spaced apart by a predetermined distance in the vertical direction of a vehicle body with respect to a vehicle wheel support member when the vehicle suspension device is mounted on the vehicle body, and can effectively suppress generation of a vibration at the mounting portion which makes passengers uncomfortable.

In order to achieve the above object, according to the present invention, a vehicle suspension mounting structure for mounting a suspension device to a vehicle body, at least an upper arm of the suspension device being constituted by two link members disposed to be spaced apart by a predetermined distance in a vertical direction of the vehicle body with respect to a vehicle wheel support member, comprises mounting means for mounting a rear end of the upper link member to an upper frame extending along a back-and-forth direction of the vehicle body.

In the suspension mounting structure of a first aspect of the present invention, the upper frame comprises a wheel apron reinforcement member.

In the suspension mounting structure of a second aspect of the present invention, the wheel apron reinforcement member comprises a bulged portion which is smoothly bulged downward on its rear portion, and the mounting means comprises a mounting bracket, fixed to the bulged portion, for axially and pivotally supporting the rear end of the upper link member.

In the suspension mounting structure of a third aspect of the present invention, the mounting bracket is fixed to an inclined surface of the bulged portion.

The suspension mounting structure of a fourth aspect of the present invention, further comprises a coupling member for coupling the wheel apron reinforcement member and a hinge pillar, and the mounting means comprises a mounting bracket, mounted on the coupling member, for axially and pivotally supporting the rear end of the upper link member.

In the suspension mounting structure of a fifth aspect of the present invention, the wheel apron reinforcement member is joined to the hinge pillar to be substantially perpendicular to each other, the coupling member is coupled to obliquely intersect the wheel apron reinforcement member and the hinge pillar, and the mounting bracket is fixed to an inclined surface of the coupling member.

The suspension mounting structure of a sixth aspect of the present invention, further comprises a coupling member for coupling the wheel apron reinforcement member and a front side frame.

In the suspension mounting structure of a seventh aspect of the present invention, the mounting means comprises a mounting bracket for axially and pivotally supporting a rear end of the upper link member.

In the suspension mounting structure of an eighth aspect of the present invention, the mounting bracket comprises the coupling member as side plates.

According to the vehicle suspension mounting structure with the above arrangement, the mounting portion of the rear end of the upper link member is set on the upper frame extending along the back-and-forth direction of the vehicle body. The upper frame has a high rigidity since it has a closed section, and can provide a sufficient mounting rigidity. As a result, a sufficient mounting rigidity at the mounting portion can be attained, and the upper link member having a high rigidity can be reliably mounted. Therefore, generation of a vibration in the mounting portion which makes passengers uncomfortable can be suppressed.

The mounting portion of the rear end of the upper link member is set on the coupling member for coupling the upper frame and the hinge pillar. In this manner, the coupling member is disposed to couple the upper frame and the hinge pillar having a high rigidity to each other, and the mounting portion set on this coupling member can have a high rigidity. As a result, a sufficient mounting rigidity of the mounting portion can be attained, and the upper link member having a high rigidity can be reliably mounted. Therefore, generation of a vibration in the mounting portion which makes passengers uncomfortable can be suppressed.

Furthermore, the mounting portion of the rear end of the upper link member is set to couple the upper panel and the front frame which have a high rigidity to each other. As a result, the upper link member can have a sufficient mounting rigidity. Thus, the upper link member having a high rigidity can be reliably received. Therefore, generation of a vibration in the mounting portion which makes passengers uncomfortable can be suppressed.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

The first through third embodiments of a vehicle suspension mounting structure according to the present invention will be described hereinafter with reference to the accompanying drawings.

Figure 1:
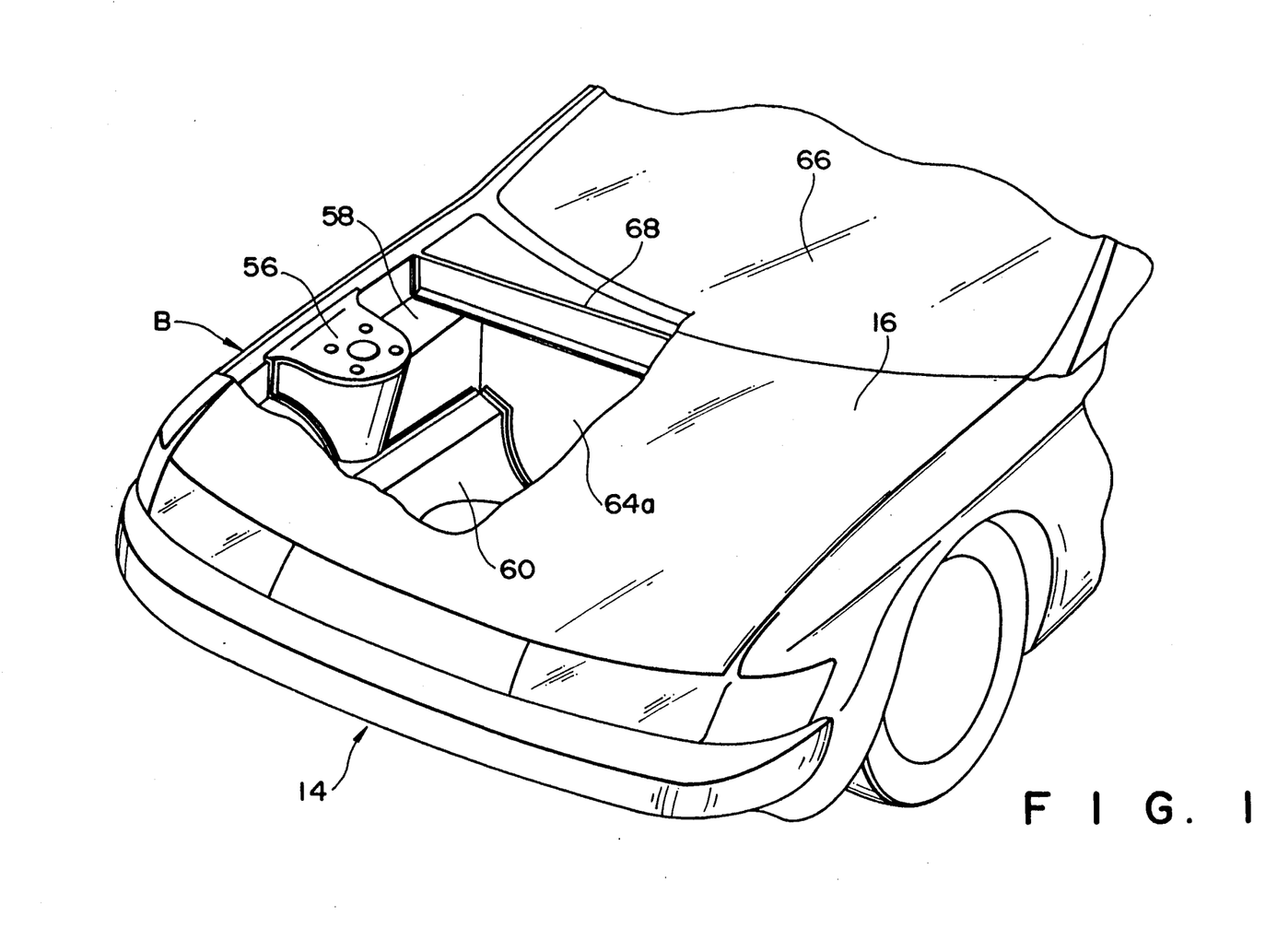
FIG. 1 is a partially cutaway perspective view of a structure of a vehicle to which a vehicle suspension mounting structure according to the present invention is applied.

FIG. 1 shows a vehicle 14 whose bonnet 16 is partially cut away and on which a suspension device 12 is mounted via a suspension mounting structure 10 according to one of the first through third embodiments. More specifically, the suspension device 12 mounted on a vehicle body B via the suspension mounting structure 10 is used for a front wheel. FIG. 1 illustrates the suspension device 12 for a front right wheel FR.

The structure of the suspension device 12 to be mounted on the vehicle body B via the suspension mounting structure 10 will be described below with reference to FIGS. 2 through 5.

FIGS. 2 through 5 are respectively a perspective view, a plan view, a rear view, and a side view when viewed outwardly from the interior of the vehicle body, showing the suspension device 12 for the front right wheel of the vehicle.

The front right wheel FR is rotatably supported by a vehicle wheel support member 18, and is coupled to the vehicle body B via the suspension device 12. In other words, the front right portion of the vehicle body B is suspended by the vehicle wheel support member 18 via the suspension device 12. The vehicle wheel support member 18 integrally comprises a first extending portion 18a extending upward from the uppermost end of a rim 20 of the front right wheel FR, as can be seen from FIGS. 2 through 5, and a second extending portion 18b which extends inwardly backward, and on which a tie rod T of a steering system is mounted to be pivotal about a vertical axis, as can be seen from FIGS. 2 through 4.

Figure 2:
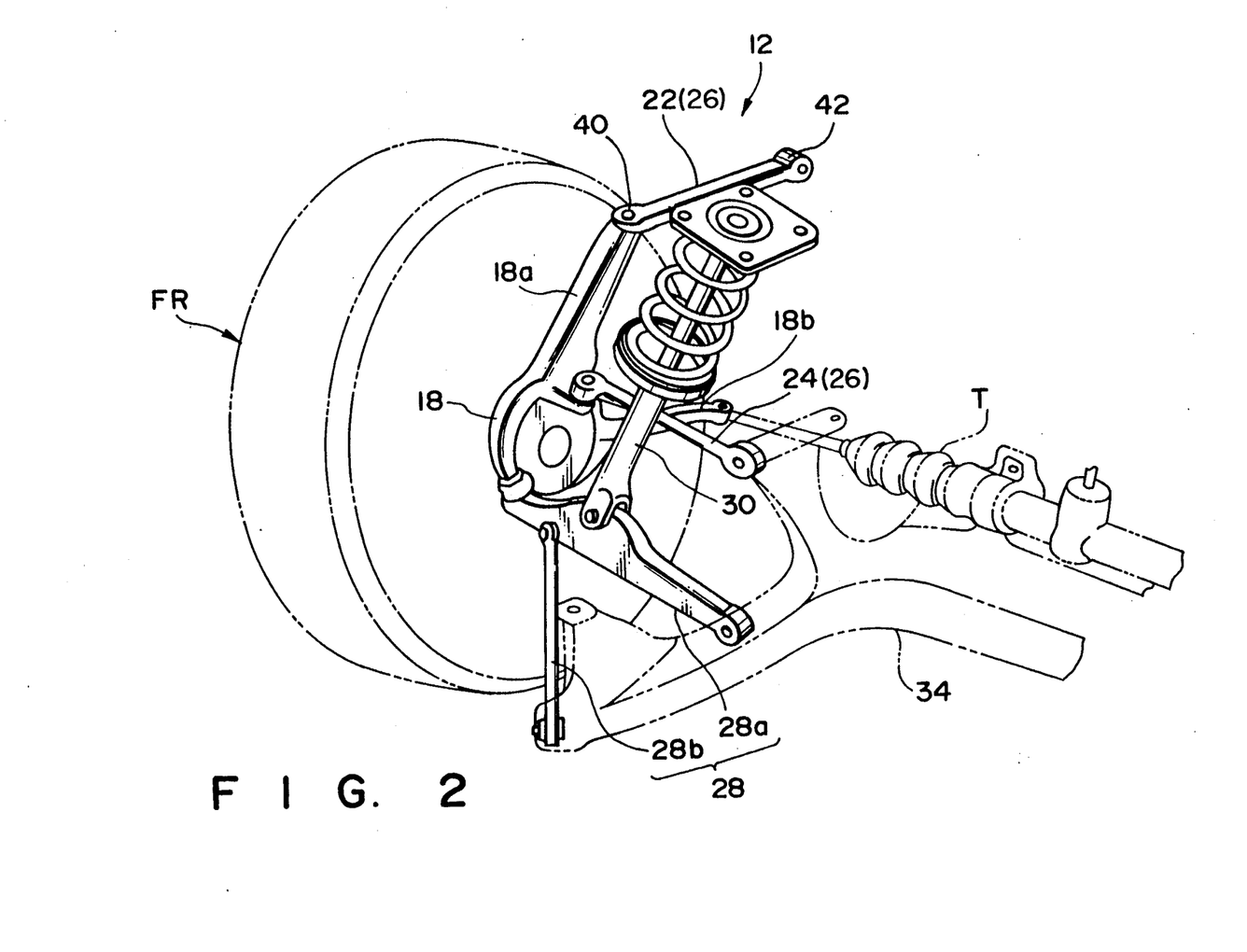
FIG. 2 is a perspective view showing a structure of a suspension device mounted on a vehicle body via the suspension mounting structure.

As shown in FIG. 2, the suspension device 12 comprises an upper arm 26 which is constituted by first and second upper arms 22 and 24 as link members connected to the vehicle wheel support member 18, a substantially A-shaped lower arm 28, and a shock absorber 30.

Figure 4:
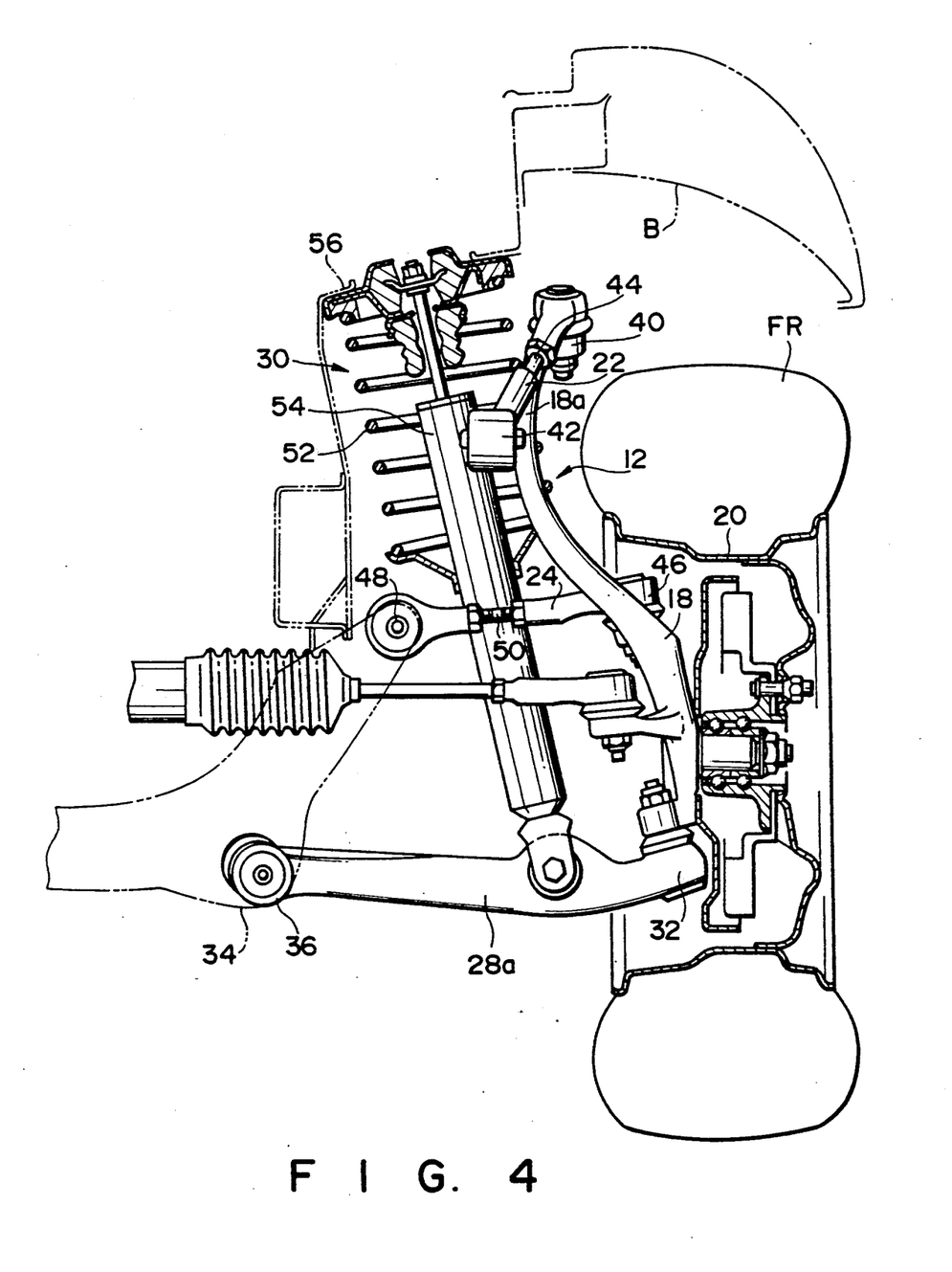

The A-shaped lower arm 28 is constituted by an I-shaped arm body 28a extending substantially along the widthwise direction of the vehicle body, and a tension link 28b firmly fixed to the distal end portion of the arm body 28a to define a predetermined steep angle with it. As shown in FIG. 4, one end of the arm body 28a constituting a top portion of the "A" shape is mounted on the lower end of the vehicle wheel support member 18 via a rubber bushing 32 to be rotatable substantially about the vertical axis.

Figure 3:
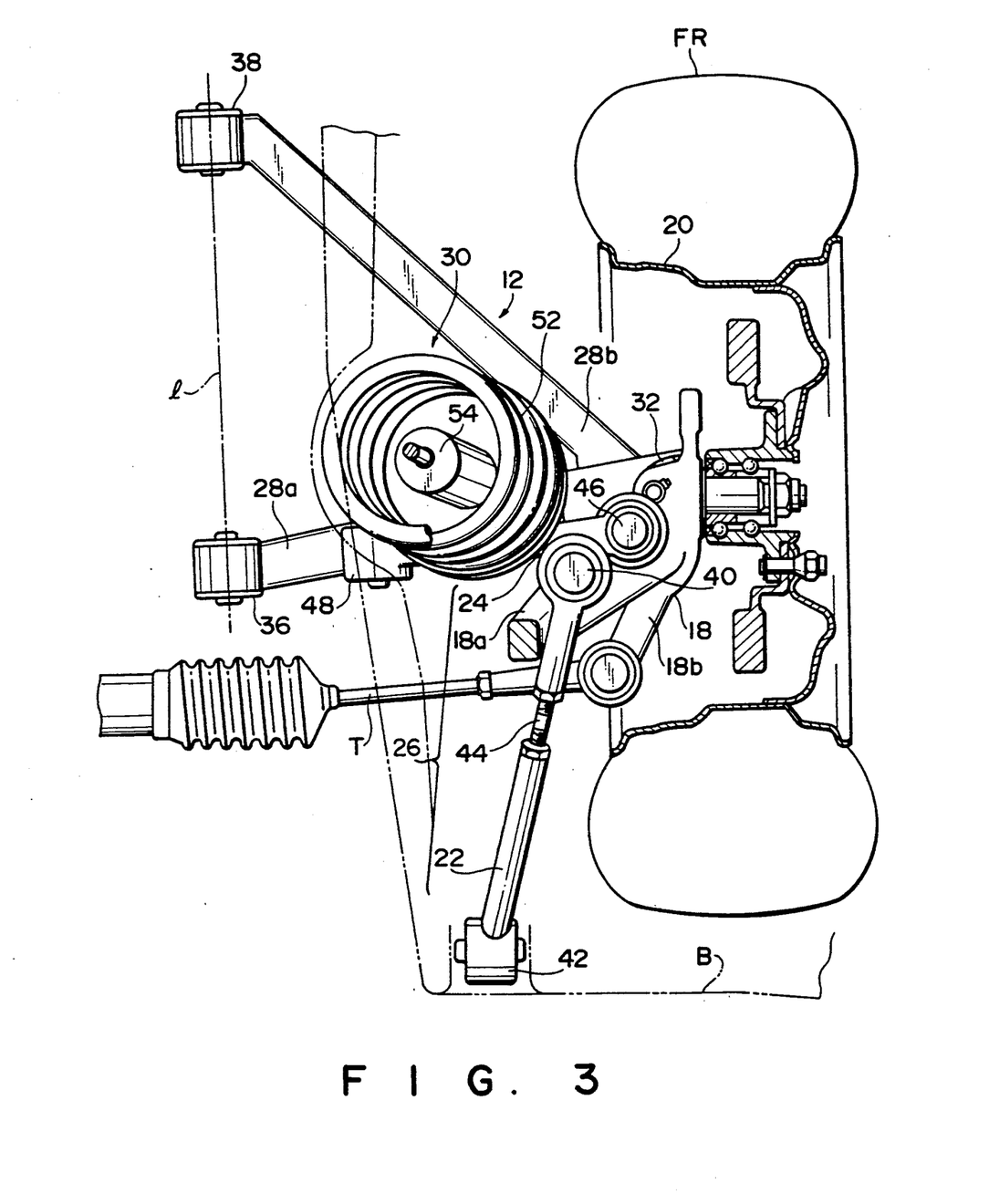
FIGS. 3 through 5 are respectively a plan view, a rear view, and a side view when viewed outwardly from the interior of the vehicle body, showing in detail the structure of the suspension device shown in FIG. 2.

The other end of the arm body 28a constituting a bottom portion of the "A" shape and the other end portion of the tension link 28b are respectively mounted on a cross member 34 of the vehicle body B via rubber bushings 36 and 38 to be rotatable about a substantially horizontal axis extending in the back-and-forth direction of the vehicle body. The two rubber bushings 36 and 38 are disposed to be located along an axis (parallel to the central line of the vehicle body B, as shown in FIG. 3.

The A-shaped structure constituted by the arm body 28a and the tension link 28b of the lower arm 28 is suitable for a front-wheel driving vehicle since it can assure a space for arranging a drive axle. However, in a rear-wheel driving vehicle, since the drive axle need not be arranged in such a portion, the lower arm 28 need not be divided into two sections, and is integrally formed into an A shape.

The first upper arm 22 constituting the upper portion of the upper arm 26 regulates a displacement of the vehicle wheel support member 18 in the back-and-forth direction of the vehicle body. More specifically, one end of the first upper arm 22 is mounted on the upper end of the first extending portion 18a of the vehicle wheel support member 18 via a rubber bushing 40 to be rotatable substantially about the vertical axis.

The other end of the first upper arm 22 is mounted on the vehicle body B via the suspension mounting structure 10 as the characteristic feature of the present invention. As will be described in detail later, the other end of the first upper arm 22 is mounted on a specific portion of the vehicle body B via a rubber bushing 42 to be rotatable about a horizontal axis extending along the widthwise direction of the vehicle body. More specifically, the first upper arm extends backward from the vehicle wheel support member 18 substantially along the back-and-forth direction of the vehicle body above the uppermost end of the rim 20 of the front right wheel FR.

Figure 5:
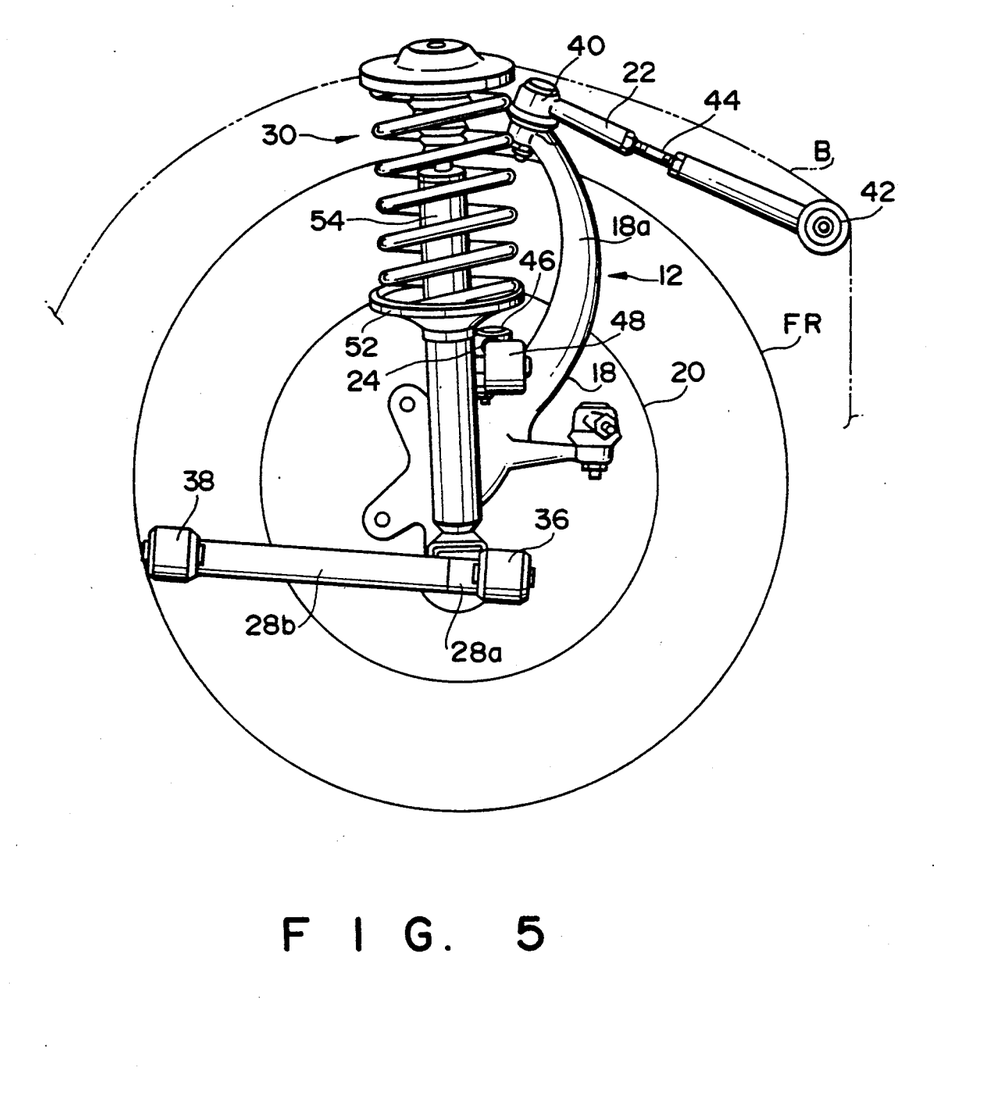

As can be seen from FIG. 5, the first upper arm 22 is arranged so that its rear portion with respect to the vehicle body is inclined toward a lower portion of the vehicle body. With this inclined arrangement, an instantaneous rotational center of the front right wheel FR defined by an axis for regulating a displacement of the vehicle wheel support member 18 of the lower arm 28 in the back-and-forth direction of the vehicle body, i.e., an axis connecting the rubber bushings 36 and 38 is set on the rear side of the front right wheel FR, thus achieving an anti-dive effect when the front right wheel FR is braked.

A turn buckle 44 is disposed in the middle portion of the first upper arm 22 arranged as described above. The length of the first upper arm 22 is adjusted via the turn buckle 44, thereby adjusting a castor angle of the front right wheel FR.

The second upper arm 24 extends in substantially the widthwise direction of the vehicle body, and regulates a displacement of the vehicle wheel support member 18 in the widthwise direction of the vehicle body. One end of the second upper arm 24 is mounted on a portion of the vehicle wheel support member 18 at a level lower than the uppermost end of the rim 20 of the front right wheel FR via a rubber bush 46 to be rotatable substantially about the vertical axis.

The other end of the second upper arm 24 is mounted on the cross member 34 of the vehicle body via a rubber bushing 48 to be rotatable about the horizontal axis extending in the back-and-forth direction of the vehicle body. The length of the second upper arm 24 is almost equal to that of the upper arm of a conventional unequal length link type double-wishbone suspension device, and is larger than an upper arm of Japanese Utility Model Publication No. 62-1762.

A turn buckle 50 is disposed in a middle portion of the second upper arm 24 arranged as described above. When the length of the second upper arm 24 is adjusted via the turn buckle 50, the camber angle of the front right wheel FR can be adjusted.

The above-mentioned shock absorber 30 comprises a coil spring 52 and a damper 54, and extends in the vertical direction. Note that the lower end of the damper 54 is mounted on the lower arm 28 to be pivotal about the horizontal axis extending in the back-and-forth direction of the vehicle body, and its upper end is rotatably mounted on a suspension tower upper portion 56 (FIG. 1). The coil spring 52 is fitted around the damper 54. The upper end of the coil spring 52 is fixed to the lower surface of the suspension tower upper portion 56, and its lower end is fixed to an almost middle portion of the damper 54.

Since the suspension device 12 is arranged as described above, it has the following effects.

(1) Since the first upper arm 22 is disposed above the uppermost end of the rim of the front right wheel FR, a distance between the support point of the vehicle wheel support member 18 of the first upper arm 22 and the rotational center of the front right wheel FR is prolonged. Therefore, the softer rubber bushing 40 for pivotally supporting the first upper arm 22 on the vehicle body B can be used. As a result, improvement of riding comfort and prevention of brake jadder can be attained at the same time.

(2) Since the first upper arm 22 as a member for regulating the displacement of the vehicle wheel support member 18 in the back-and-forth direction of the vehicle body extends along substantially the back-and-forth direction of the vehicle body, and the second upper arm 24 as a member for regulating a displacement of the vehicle wheel support member 18 in the widthwise direction of the vehicle body extends along substantially the widthwise direction of the vehicle body, caster and camber angles can be independently adjusted by adjusting the corresponding turn buckles 44 and 50 without interfering with each other.

(3) Since the first and second upper arms 22 and 24 are separated as described above, they can be disposed by effectively utilizing a space, thus allowing an improved layout.

(4) Since the second upper arm 24 as a member for regulating a displacement of the vehicle wheel support member 18 in the widthwise direction of the vehicle body is disposed below the uppermost end of the rim of the vehicle wheel, this portion has a relatively large space in a lateral direction. Therefore, the second upper arm 24 can be relatively prolonged, and hence, a change in camber angle can be optimized.

The first embodiment of the suspension mounting structure 10, as the characteristic feature of the present invention, for mounting the first upper arm 22 of the suspension device 12 arranged as described above to the vehicle body B will be described in detail below with reference to FIG. 1 and FIGS. 6 through 9.

A structure of the vehicle body B near a portion where a mounting bracket constituting this suspension mounting structure 10 will be briefly described below with reference to FIGS. 1, 6, and 7.

Figure 6:
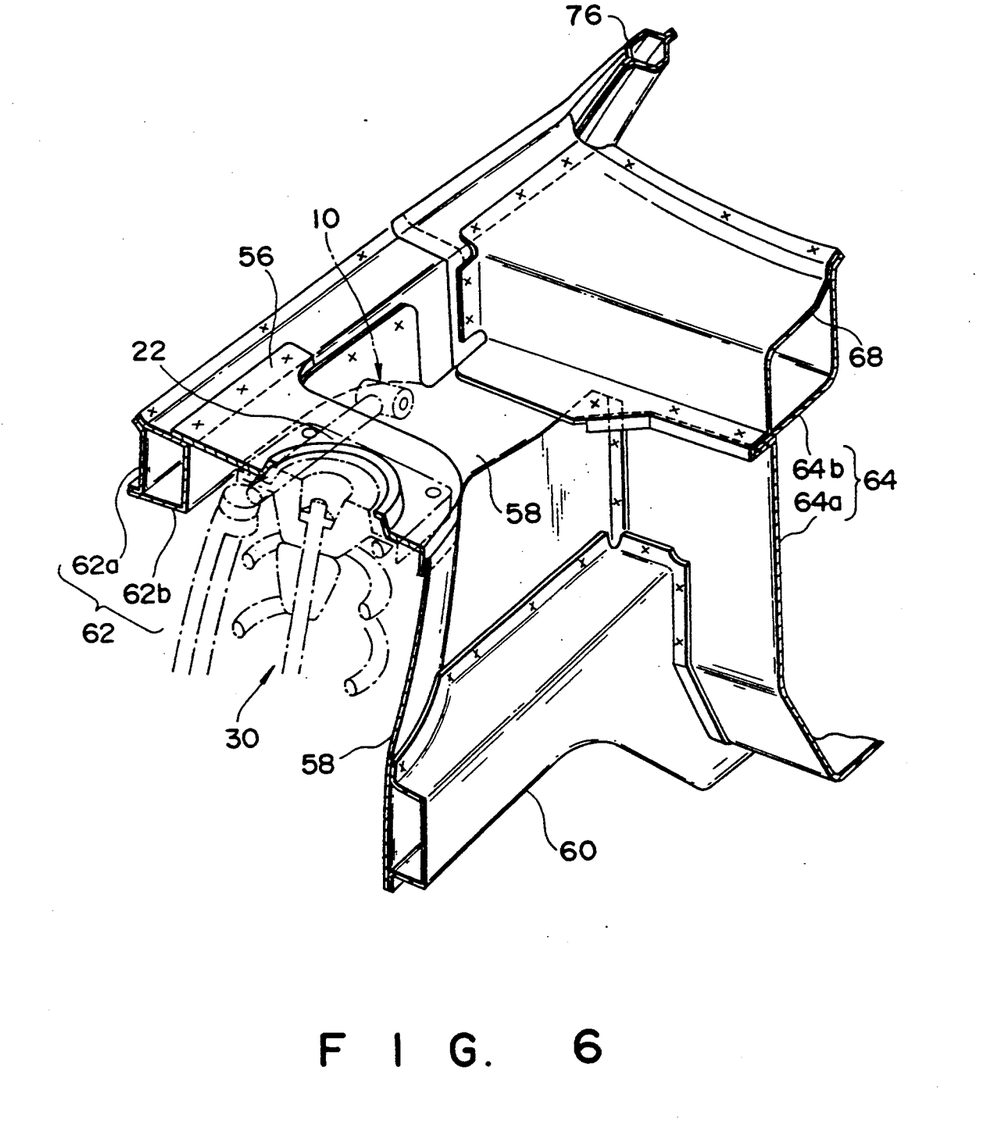
FIG. 6 is a perspective view showing a structure of the first embodiment of a vehicle suspension mounting structure according to the present invention when viewed obliquely backward from an engine room.

In this vehicle body B, as shown in FIG. 6, the suspension tower upper portion 56 is formed on the upper end of a wheel apron 58 constituting a tire house storing the front right wheel FR, and is fixed to close an opening located above the shock absorber 30. The wheel apron 58 is fixed to a front side frame 60 extending along the back-and-forth direction on the right side of the lower portion of the vehicle body.

The wheel apron 58 and the suspension tower upper portion 56 are fixed to a wheel apron reinforcement member 62 extending along the back-and-forth direction above the right side portion of the vehicle body. The wheel apron reinforcement member 62 serves as an upper frame in the first embodiment, and is constituted by a wheel apron reinforcement outer portion 62a and a wheel apron reinforcement inner portion 62b fixed to the inner portion of the portion 62a to form a closed section extending along the back-and-forth direction. The wheel apron 58 and the suspension tower upper portion 56 are fixed to the wheel apron reinforcement inner portion 62b.

Figure 7:
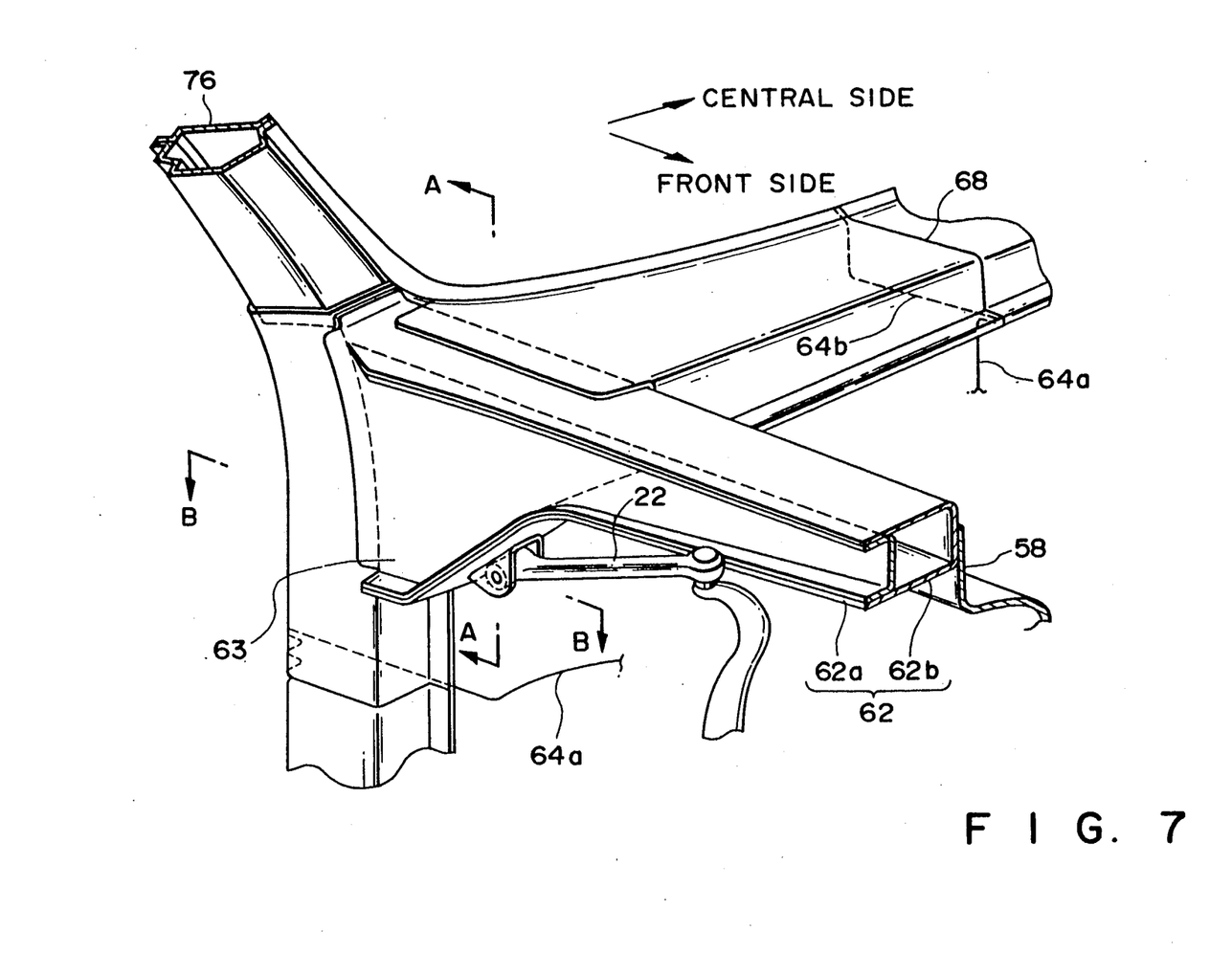
FIG. 7 is a perspective view showing the suspension mounting structure shown in FIG. 6 when viewed obliquely backward from outside the vehicle body.

The wheel apron reinforcement member 62 integrally comprises a bulged portion 63 which is smoothly bulged downward from a rear portion of the member 62, as shown in FIG. 7. More specifically, in order to form the bulged portion 63, the wheel reinforcement outer and inner portions 62a and 62b are formed to be smoothly and integrally bulged downward from their rear portions.

In order to partition an engine room and a passenger's room, as shown in FIG. 6, an upright dash panel 64 extending in the widthwise direction of the vehicle body is fixed to the front side frame 60 and the wheel apron 58. The dash panel 64 is constituted by a dash panel lower portion 64a extending upward substantially to a disposition level of the wheel apron 58, and a dash panel upper portion 64b fixed to the upper end of the dash panel lower portion 64a and extending upward to the lower end of a front window glass 66.

The upper end of the dash panel lower portion 64a is bent forward. The lower end (i.e., front end) of the dash panel upper portion 64b is fixed to the upper surface of the bent portion to overlap it. On the other hand, the rear end of the wheel apron 58 is fixed to the lower surface of the bent portion to overlap it. The distal end of a cowl panel 68 is fixed to the upper surface of the front end of the dash panel upper portion 64b to overlap it.

Note that the cowl panel 68 constitutes a closed section extending along the widthwise direction of the vehicle body together with the dash panel upper portion 64b. The rear end of the cowl panel 68 is fixed to the rear end of the dash panel upper portion 64b to overlap it. The lower end of the front window glass 66 is terminated immediately above the rear end of the cowl panel 68.

A joint portion between the dash panel lower and upper portions 64a and 64b extends below the wheel apron reinforcement inner portion 62b, and the lower surface of the wheel reinforcement inner portion 62b is fixed to the upper surface of the dash panel upper portion 64b. In this manner, the high rigidity of the dash panel 64 is guaranteed.

An inner end portion of a front fender panel (not shown) for defining the outer shape of the vehicle body B to be smoothly contiguous with the bonnet 16 is fixed to the upper surface of the wheel apron reinforcement inner portion 62b. Note that reference numeral 76 in FIGS. 6 through 8 denotes a hinge pillar; reference numeral 78 denotes a cowl side panel.

A fixing state of the mounting bracket for mounting the rear end of the first upper arm 22 of the suspension device 12 to the vehicle body B will be described in detail below with reference to FIGS. 6 through 8.

More specifically, the mounting structure 10 comprises a mounting bracket 74 for axially supporting the rear end of the first upper arm 22 to be rotatable about a horizontal pivot shaft 72 extending in the widthwise direction of the vehicle body. The mounting bracket 74 is formed into a U shape with an open lower surface when viewed from the front side, as can be seen from FIG. 7. More specifically, the mounting bracket 74 is constituted by two side plates 74a and 74b, and a top plate 74c for coupling the upper ends of the two side plates 74a and 74b. As can be seen from FIG. 7, the top plate 74c comprises an inclined surface so as to be mounted on an inclined surface of the bulged portion 63 of the wheel apron reinforcement member 62.

Figure 8:
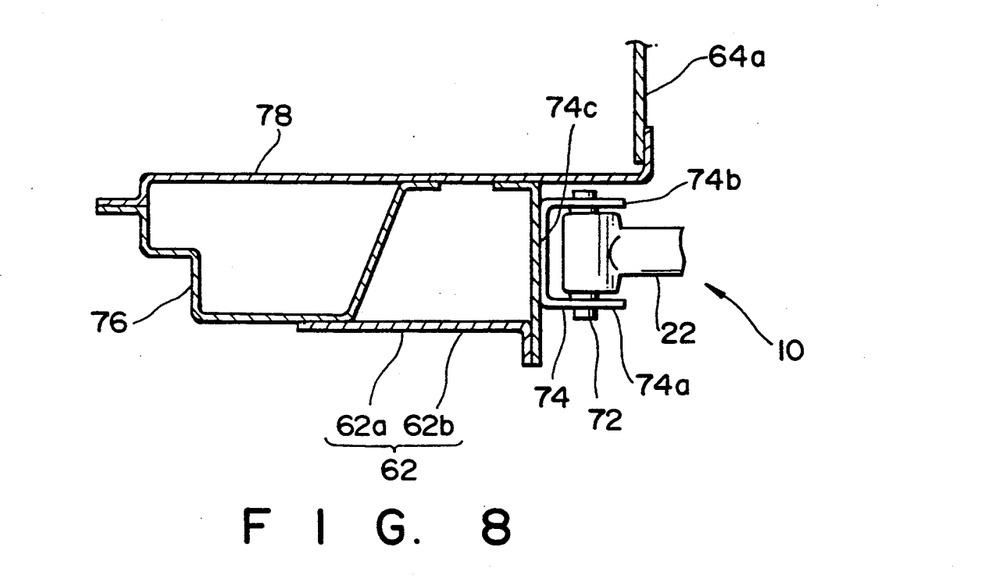
FIG. 8 is a longitudinal sectional view taken along a line A—A of the suspension mounting structure shown in FIG. 7.
Figure 9:
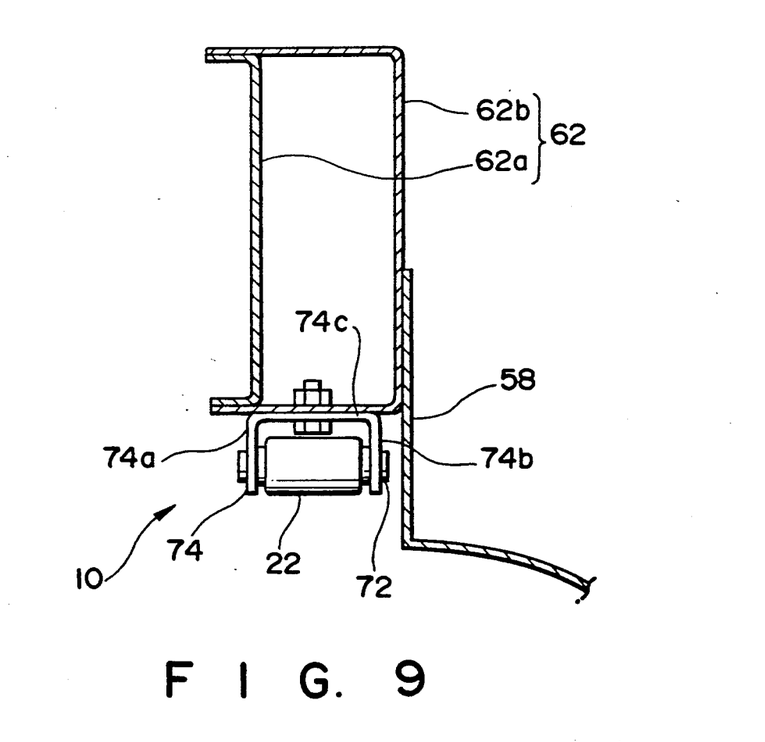
FIG. 9 is a cross-sectional view taken along a line B—B of the suspension mounting structure shown in FIG. 7.

As is apparent from FIGS. 8 and 9, a portion where the top plate 74c of the mounting bracket 74 is fixed is set on the inclined surface of the downwardly bulged portion 63 of the wheel apron reinforcement member 62 which forms a closed section. As a result, the fixing portion of the mounting bracket 74, in other words, of the mounting portion of the first upper arm 22 can have a very high rigidity.

In this manner, according to the first embodiment, since a sufficiently high mounting rigidity of the first upper arm 22 can be set, an excessive suspension force acting on the first upper arm 22 can be withstood, and generation of a vibration in this mounting portion which makes a driver and passengers uncomfortable due to an insufficient rigidity can be effectively suppressed.

The present invention is not limited to the arrangement of the first embodiment, and various changes and modifications may be made within the spirit and scope of the invention.

For example, in the first embodiment, a mounting portion where the rear end of the first upper arm 22 is mounted, i.e., a portion where the mounting bracket 74 is fixed is set on the bulged portion 63 formed integrally with the wheel apron reinforcement member 62. However, the present invention is not limited to this arrangement. For example, the mounting portion may be set on a bulged portion fixed, as a separate member, to the lower surface of the rear portion of the wheel apron reinforcement member 62.

Arrangements of various embodiments of a suspension mounting structure according to the present invention will be described below. The same reference numerals in the following description denote the same parts as in the first embodiment, and a detailed description thereof will be omitted.

Figure 10:
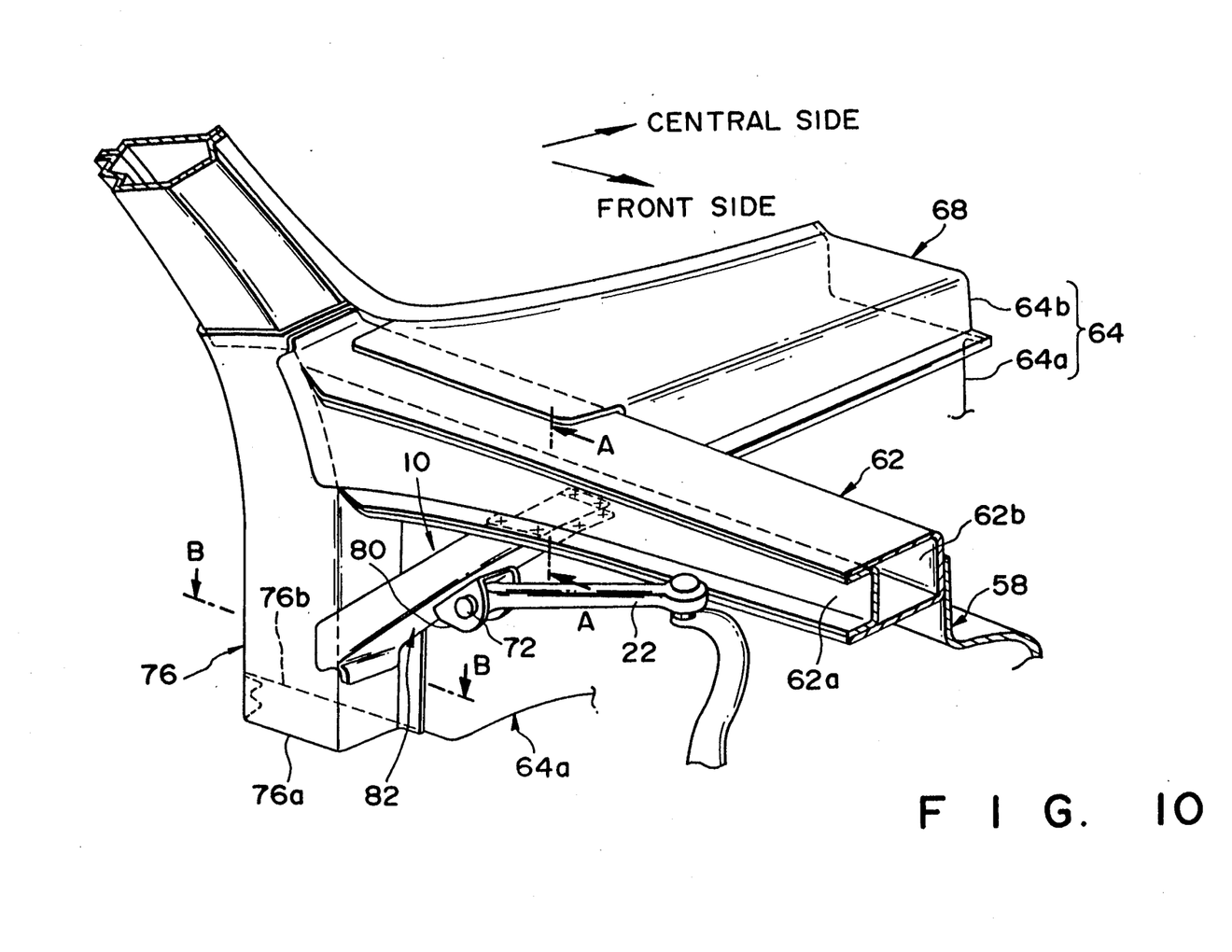
FIG. 10 is a perspective view showing the second embodiment of a vehicle suspension mounting structure according to the present invention when viewed obliquely backward from outside the vehicle body.
Figure 11:
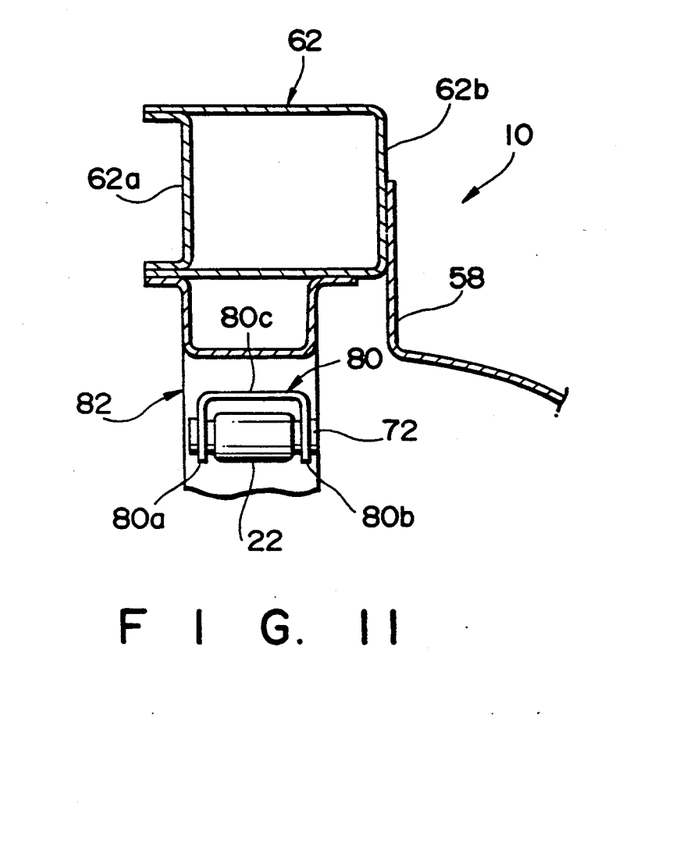
FIG. 11 is a longitudinal sectional view taken along a line A—A of the suspension mounting structure shown in FIG. 10.
Figure 12:
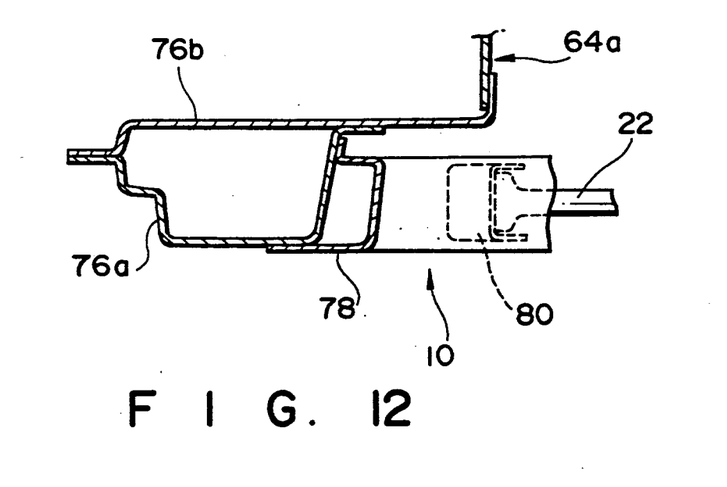
FIG. 12 is a cross-sectional view taken along a line B—B of the suspension mounting structure shown in FIG. 10.

In the first embodiment described above, the rear portion of the wheel apron reinforcement member 62 comprises the bulged portion 63 which is integrally formed to be smoothly bulged downward, and the mounting bracket 74 is mounted on the inclined surface of the bulged portion 63. However, the present invention is not limited to this arrangement, and may be arranged as shown in FIGS. 10 through 12 as the second embodiment.

The arrangement of the second embodiment of a suspension mounting structure 10, according to the present invention, for mounting a first upper arm 22 of a suspension device 12 to a vehicle body B will be described below with reference to FIGS. 10 through 12.

In the arrangement of the vehicle body B of the second embodiment, no bulged portion 63 is formed on the rear portion of a wheel apron reinforcement member 62 unlike in the first embodiment, and the wheel apron reinforcement member 62 is formed into a substantially straight shape. As shown in FIG. 10, wheel apron reinforcement outer and inner portions 62a and 62b are fixed to a hinge pillar outer portion 76a which constitutes a hinge pillar 76 with a hinge pillar inner portion 76b.

A fixing state of a mounting bracket for mounting the first upper arm 22 of the suspension device 12 to the vehicle body B will be described in detail below with reference to FIGS. 10 through 12.

More specifically, the mounting structure 10 of the second embodiment comprises a mounting bracket 80 for axially supporting the rear end of the first upper arm 22 to be rotatable about a horizontal pivot shaft 72 extending in the widthwise direction of the vehicle body. As is apparent from FIG. 12, the mounting bracket 80 is formed into a substantially U shape with an open lower surface when viewed from the top. More specifically, the mounting bracket 80 is constituted by two side plates 80a and 80b, and a coupling plate 80c for coupling the upper ends of the two side plates 80a and 80b. As can be seen from FIG. 10, the rear end portion of the wheel apron reinforcement member 62 serving as an upper frame and the upper end portion of the hinge pillar 76 to which the member 62 is fixed are coupled to each other via an oblique coupling member 82. As shown in FIG. 10, the coupling plate 80c of the mounting bracket 80 described above is fixed to the inclined front surface of the coupling member 82.

As shown in FIGS. 11 and 12, since the coupling member 82 to which the coupling plate 80c of the mounting bracket 80 is fixed is disposed to couple the wheel apron reinforcement member 62 and the hinge pillar 76, rigidities of which are improved by forming a closed section, the rigidity of the coupling member 82 itself is also high. As a result, a mounting rigidity of a fixing portion of the mounting bracket 80, in other words, of a mounting portion of the first upper arm 22 can be set to be very high.

In the second embodiment, since the mounting rigidity of the first upper arm 22 is set to be sufficiently high, an excessive suspension force acting on the first upper arm 22 can be withstood, and generation of a vibration in this mounting portion which makes a driver and passengers uncomfortable due to an insufficient rigidity can be effectively suppressed. The joint rigidity at the joint portion between the wheel apron reinforcement member 62 and the hinge pillar 76, which are coupled through the coupling member 82, can be increased, and the rigidity of the vehicle body as a whole can also be increased. Note that reference numeral 78 in FIG. 12 denotes a cowl side panel.

Figure 13:
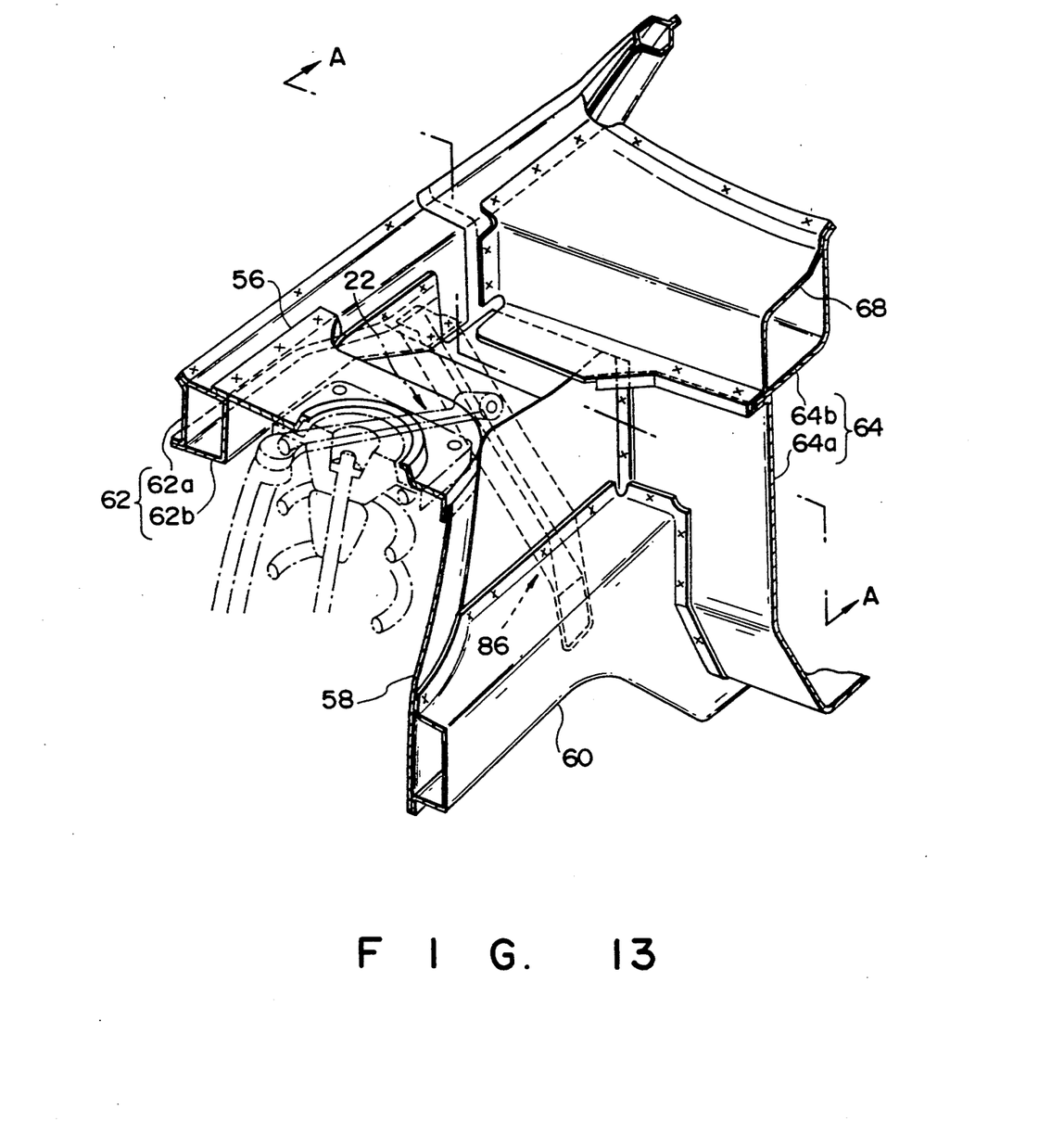
FIG. 13 is a perspective view showing the third embodiment of a vehicle suspension mounting structure according to the present invention when viewed obliquely backward from outside the vehicle body.
Figure 14:
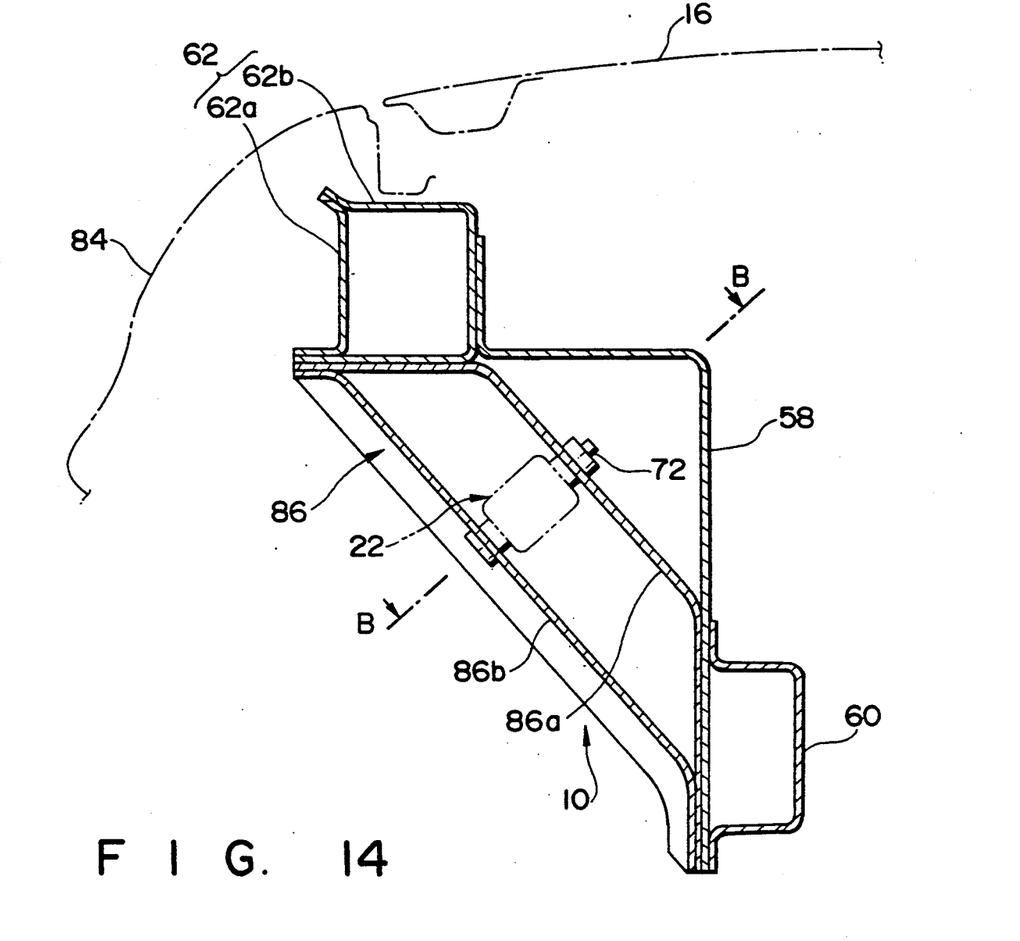
FIG. 14 is a longitudinal sectional view taken along a line A—A of the suspension mounting structure shown in FIG. 13.
Figure 15:
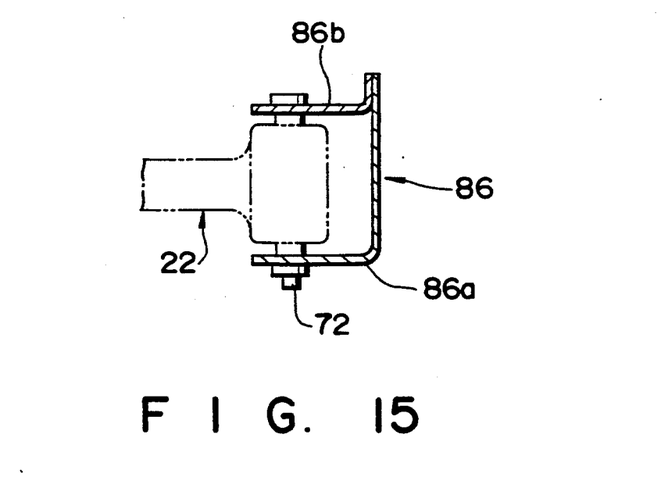
FIG. 15 is a cross-sectional view taken along a line B—B of the suspension mounting structure shown in FIG. 14.

In the second embodiment, the mounting bracket 74 is mounted on the coupling member 82 for coupling the wheel apron reinforcement member 62 and the hinge pillar 76. However, the present invention is not limited to this, and may be arranged as shown in FIGS. 13 through 15 as the third embodiment.

The arrangement of the third embodiment of a suspension mounting structure 10, as the characteristic feature of the present invention, for mounting a first upper arm 22 of a suspension device 12 to a vehicle body B will be described below with reference to FIGS. 13 through 15.

The structure of a vehicle body B near a portion where a mounting bracket constituting this suspension mounting structure 10 will be briefly described below with reference to FIGS. 1 and 13.

In the third embodiment, no coupling member 82 for coupling a wheel apron reinforcement member 62 and a hinge pillar 76 is used in the arrangement of the vehicle body B. As shown in FIG. 13 on the right side of the vehicle body, the right end portion of a cowl panel 68 stands upright along the left side surface of a wheel apron reinforcement inner portion 62b, and is then bent outwardly along the upper surface of the portion 62b. The cowl panel 68 and the wheel apron reinforcement inner portion 62b are fixed to each other.

An inner end portion of a front fender panel 84 for defining the outer shape of the vehicle body B to be smoothly contiguous with a bonnet 16 is fixed to the upper surface of the wheel apron reinforcement inner portion 62b.

A fixing state of a mounting bracket for mounting the first upper arm 22 of the suspension device 12 to the vehicle body B with the above arrangement will be described in detail below with reference to FIGS. 13 through 15.

The mounting structure 10 of the third embodiment comprises a mounting bracket 86 for axially supporting the rear end of the first upper arm 22 to be rotatable about a horizontal pivot shaft 72 extending in the widthwise direction of the vehicle body. As shown in FIG. 15, the mounting bracket 86 is formed into a substantially U shape with an open lower surface when viewed from the top. More specifically, the mounting bracket 86 is constituted by two side plates 86a and 86b.

The mounting bracket 86 serves as a coupling member, and couples a front side frame 60 and the wheel reinforcement member 62 as the upper frame to each other in the third embodiment. One side plate 86a of the mounting bracket 86 is formed by bending a flat plate. The upper end of the side plate 86a is fixed to the lower surface of a wheel apron reinforcement inner portion 62b of the wheel apron reinforcement member 62, and its lower end is fixed to a portion of a wheel apron 58 where the front side frame 60 is fixed.

The other side plate 86b is formed to have a substantially L-shaped section unlike the side plate 86a. The upper end of the side plate 86b is fixed to the lower surface of the distal end portion of the upper end of the side plate 86a, and its lower end is fixed to the distal end portion of the lower end of the side plate 86a. Note that the pivot shaft 72 is axially and rotatably supported to extend between the two side plates 86a and 86b.

The portions where the two end portions of the mounting bracket 86 are fixed are the front side frame 60 and the wheel apron reinforcement member 62, as shown in FIGS. 13 and 14, and their rigidities are set to have very high values since they form closed sections. As a result, the mounting rigidity of the fixing portion of the mounting bracket 86, in other words, of the mounting portion of the first upper arm 22 can be set to be very high.

In the third embodiment, since the mounting rigidity of the first upper arm 22 is set to be sufficiently high, an excessive suspension force acting on the first upper arm 22 can be withstood, and generation of a vibration in this mounting portion which makes a driver and passengers uncomfortable due to an insufficient rigidity can be effectively suppressed.

In the third embodiment, since the wheel apron reinforcement member 62 as the upper frame and the front side frame 60 are coupled to each other through the mounting bracket 86 serving as a coupling member for coupling these members, the rigidity of the vehicle body can be further increased.

As many apparently widely different embodiments of the present invention can be made without departing from the spirit and scope thereof, it is to be understood that the invention is not limited to the specific embodiments thereof except as defined in the appended claims.

What is claimed is:

1. A vehicle suspension mounting structure for mounting a suspension device to a vehicle body, at least an upper arm of said suspension device being constituted by two link members disposed to be spaced apart by a predetermined distance in a vertical direction of said vehicle body with respect to a vehicle wheel support member,
    said suspension mounting structure comprising:
        mounting means for mounting a rear end of said upper link member to an upper frame which includes a wheel apron reinforcement member and which extends rearwardly along a back-and-forth direction of the vehicle body.

2. The suspension mounting structure according to claim 1, wherein
    said wheel apron reinforcement member comprises a bulged portion which is smoothly bulged downward on a rear portion thereof, and
    said mounting means comprises a mounting bracket, fixed to said bulged portion, for axially and pivotally supporting the rear end of the upper link member.

3. The suspension mounting structure according to claim 2, wherein
    said mounting bracket is fixed to an inclined surface of said bulged portion.

4. The suspension mounting structure according to claim 1, which further comprises:
    a coupling member for coupling said wheel apron reinforcement member and a hinge pillar, and
    wherein said mounting means comprises a mounting bracket, mounted to said coupling member, for axially and pivotally supporting the rear end of said upper link member.

5. The suspension mounting structure according to claim 4, wherein
    said wheel apron reinforcement member is joined to said hinge pillar to be substantially perpendicular to each other,
    said coupling member is coupled to obliquely intersect said wheel apron reinforcement member and said hinge pillar, and
    said mounting bracket is fixed to an inclined surface of said coupling member.

6. The suspension mounting structure according to claim 1, which further comprises:
    a coupling member for coupling said wheel apron reinforcement member and a front side frame.

7. The suspension mounting structure according to claim 6, wherein
    said mounting means comprises a mounting bracket for axially and pivotally supporting a rear end of said upper link member.

8. The suspension mounting structure according to claim 7, wherein
    said mounting bracket comprises said coupling member as side plates.

* * * * *

UNITED STATES PATENT AND TRADEMARK OFFICE
CERTIFICATE OF CORRECTION

PATENT NO. : 5,102,164

DATED : April 7, 1992

INVENTOR(S) : Mitsuru Fijinaka et al.

It is certified that error appears in the above-identified patent and that said Letters Patent is hereby corrected as shown below:

Item [57], ABSTRACT; line 6, before "body" insert --vehicle--

Col. 5, line 46, delete "(" insert --(--.

Signed and Sealed this

Twenty-fourth Day of August, 1993

Attest:

BRUCE LEHMAN

Attesting Officer

Commissioner of Patents and Trademarks